(12) United States Patent
Langenecker

(10) Patent No.: US 7,306,737 B2
(45) Date of Patent: Dec. 11, 2007

(54) INACTIVATION OF MICROORGANISMS AND VIRUS IN LIQUIDS AND SLUDGE

(76) Inventor: Bertwin Langenecker, 29 Woodside Dr., Moraga, CA (US) 94556

(*) Notice: Subject to any disclaimer, the term of this patent is extended or adjusted under 35 U.S.C. 154(b) by 0 days.

(21) Appl. No.: 10/121,115

(22) Filed: Apr. 10, 2002

(65) Prior Publication Data
US 2003/0192831 A1 Oct. 16, 2003

(51) Int. Cl.
- *C02F 11/00* (2006.01)
- *C02F 1/00* (2006.01)
- *B01F 3/04* (2006.01)
- *B01F 7/26* (2006.01)

(52) U.S. Cl. .................. 210/663; 210/669; 210/688; 210/748

(58) Field of Classification Search ............ 210/663, 210/668, 669, 688, 748, 764
See application file for complete search history.

(56) References Cited

U.S. PATENT DOCUMENTS

| | | | | |
|---|---|---|---|---|
| 1,264,635 A | * | 4/1918 | Graham | 210/331 |
| 3,779,531 A | * | 12/1973 | White | 261/87 |
| 3,935,098 A | * | 1/1976 | Oda et al. | 210/688 |
| 4,220,529 A | * | 9/1980 | Daude-Lagrave | 210/758 |
| 4,370,235 A | * | 1/1983 | Suzuki et al. | 210/620 |
| 4,578,185 A | * | 3/1986 | Wilson et al. | 210/85 |
| 5,385,673 A | | 1/1995 | Fergen | 210/710 |
| 5,422,015 A | | 6/1995 | Angell et al. | 210/751 |
| 5,853,450 A | | 12/1998 | Burnham et al. | 71/9 |
| 6,123,483 A | | 9/2000 | Langenecker | 405/128 |
| 6,200,486 B1 | * | 3/2001 | Chahine et al. | 210/748 |
| 6,627,784 B2 | * | 9/2003 | Hudson et al. | 588/320 |

FOREIGN PATENT DOCUMENTS

| | | | |
|---|---|---|---|
| AT | 202280 | | 2/1959 |
| AT | 389889 | | 2/1990 |
| DE | 3903684 A1 | | 8/1990 |
| EP | 1186338 | * | 3/2002 |
| JP | 8-103778 | * | 4/1996 |

OTHER PUBLICATIONS

Laroussi, M. et al., "Plasma Interaction with Microbes", New Journal Of Physics (2003) 5:41.1-41.10.
Brown, J.C., et al., "Acoustic Cavitation: A Future Tool for Improving Public Health," Report, Nov. 2002 (4 Pages).
Brown, J.C., et al., "Emerging Disinfection Technologies," Florida Water Resources Journal, Jul. 2006 (4 pages).

* cited by examiner

Primary Examiner—Fred G. Prince
(74) Attorney, Agent, or Firm—Blakely Sokoloff Taylor & Zafman LLP

(57) ABSTRACT

A method of inactivating pathogens contaminating water and sludge, such as sewage sludge from wastewater treatment plants by exposing the contaminated material to an intense alternating mechanical field, at sonic and/or ultrasonic frequencies, producing and sustaining cavitation along spiral-shaped like paths between two or more disks, where at least one disk rotates or more than one disk rotates or the disks counter-rotate at high RPM. Alkaline material may be added to enhance the inactivation of pathogens. Heavy metals, which may also be present in the sewage sludge may be extracted from the sludge by adsorption.

13 Claims, 4 Drawing Sheets

INACTIVATION OF MICROORGANISMS AND VIRUS IN LIQUIDS AND SLUDGE

FIELD

Environmental technology and treatment sludge from wastewater treatment plants and the like.

BACKGROUND

As public awareness has increased regarding the endangering effects of pathogens in liquids and sludge from wastewater treatment plants, pertinent environmental laws and regulations for the protection of human health have become more stringent. This is particularly true for sludge from wastewater plants to be deposited on agricultural land sites, where the nutrients contained in the sludge are utilized for crop growth. There is a movement towards the banning of Class B sludge (for a definition, see US EPA Code 40 CFR, Part 503) for land applications because of the dangers to human and animal health due to the pathogens contained in Class B sludge. Some counties in California, which receive Class B sludge, have passed legislation banning such land application of Class B sludge, effective Dec. 31, 2002. In order to continue land application in these counties, which is essential for biosolids management programs, Class B sludge must be upgraded to Class A biosolids by removing the existing pathogens. Accordingly, a new economical and efficient process to upgrade Class B sludge to Class A biosolids is needed.

The quantity of Class B sludge that could be converted to Class A biosolids is enormous. Therefore, facilities to inactivate pathogens and virus in sludge should be able to handle these large quantities. This requirement limits the number of technologies available.

Currently, known technologies are primarily based on thermal treatment of sludge, heat drying and heat treatment, sewage sludge treatment in a high pH—high temperature process (alkaline treatment), thermophilic digestion, beta ray and gamma ray irradiation, pasteurization, and composting. The situation in which many wastewater treatment facilities find themselves is illustrated using the Sanitary District for the City of Los Angeles (as an example).

The City of Los Angeles currently transports nearly half a million tons of Class B sludge to agricultural land in Kern County. This sludge contains on the average 45,000 MPN/gram fecal coliform, as well as other microorganisms and virus. Effective Dec. 31, 2002, a new Kern County ordinance will effectively ban the land application of Class B sludge and allow only Class A biosolids (which are free of coliform bacteria, salmonella, helminth ova and enteric virus) to be land applied. Accordingly, the City of Los Angeles' Hyperion Treatment Plant has been actively studying the means of producing Class A biosolids. The plant concluded that among the above listed processes, the thermophilic anaerobic digestion appears best suited for the up-grading of their Class B sludge. In a paper presented at the 16$^{th}$ annual Residuals and Biosolids Management Conference, sponsored by the Water Environment Federation, in Austin, Tex., plant workers stated that the themophilic digestion of sludge requires heating the sludge to 130° F. for 12 days in a first stage of treatment. The sludge is then pumped to two, second stage digesters for six more days for more digestion. The demand on heat energy, and treatment time, for sludge treatment is enormous and leads to high costs.

U.S. Pat. No. 5,385,673 discloses a method of treating wastewater biosolids by destruction of pathogens and indicator organisms to meet or exceed USEPA Process to Further Reduce Pathogens standards. The method first depresses the pH to below 5, followed by pH increase to 12 or higher, causing an exothermic reaction and heat of hydration. The mixture is placed within a confined volume to maintain the temperature at or above 55 degrees Celsius (° C.) for at least two hours. The mixture can be dewatered for a higher percent solid characteristic. The material is then tested and if test results indicate, the material is approved by the Environmental Protection Agency for human contact. The biosolid materials are suitable for general nutrient values with minimal regulatory restriction and other beneficial uses. U.S. Pat. No. 5,385,673 is herein incorporated by reference in its entirety.

U.S. Pat. No. 5,422,015 discloses a process to treat solid waste such as sewage sludge containing fecal matter to reduce pathogens by at least 90 percent and convert the waste to a useful product such as an amendment to agricultural land by combining the waste with an acid such as concentrated sulfuric and a base such as fly ash which exothermically react and thermally pasteurize the waste and add mineral value to the product. Pozzolanic materials, such as fly ash agglomerate the product and after grinding, the particles can aerate soil. The calcium oxide in fly ash reacts with sulfuric acid to form calcium sulfate dihydrate, a soil amendment. The amount of sulfuric acid can be controlled to provide a product with acid pH which is useful to neutralize alkaline soils such as those found in the Western United States of America. U.S. Pat. No. 5,422,015 is herein incorporated by reference in its entirety.

U.S. Pat. No. 5,853,450 discloses a method of treating wastewater or bio-organic sludges containing odor, animal viruses, pathogenic bacteria, and parasites to produce a bioactive but stabilized product that is useful as a soil substitute or as a fertilizer which can be applied directly to lands which consists essentially of the following steps: mixing said sludge with at least one alkaline material, wherein the amount of added material mixed with said sludge is sufficient to raise the pH of said mixture to pH 12, and raise the conductivity to disinfect and stabilize the sludge, and adding green waste at different process locations so that a biological action occurs converting the greenwaste into a soil-like granular product with improved odor over that of the treated municipal sludge alone or a composted greenwaste alone. U.S. Pat. No. 5,853,450 is herein incorporated by reference in its entirety.

U.S. Pat. No. 6,123,483 discloses a method of treating contaminated soil and mud that comprises mixing the solid and mud with water for washing in a wet-type mixing and grinding mill, separating less contaminated larger particles from more contaminated smaller particles, and exposing more contaminated smaller particles together with the eluate to mechano-chemically activated sorption media. U.S. Pat. No. 6,123,483 is herein incorporated by reference in its entirety.

Austrian Patent "AT PS No. 2002280" issued to O. Skoeldberg, dated Feb. 25, 1959, discloses an ultrasound system. The system uses pressure waves with intermittent impulses of high pressure amplitude to sterilize samples. Austrian Patent "AT PS No. 2002280" is herein incorporated by reference in its entirety.

German Patent Number DE 3903648 A (19900816) titled "VIRUS INACTIVATION IN LIQUIDS—BY GENERATING CAVITATION" discloses an installation for deactivating viruses in liquids that includes creating cavitation in the liquid using a high pressure pump and a homogenizing valve. The pump is a membrane pump and the valve pref.

has a number of over flow edge sections. German Patent Number DE 3903648 A is herein incorporated by reference in its entirety.

Austrian Patent Number 389 889 B, dated Feb. 12, 1990 discloses the application of hypersonic sound for the inactivation of a virus in blood. Austrian Patent Number 389 889 B is herein incorporated by reference in its entirety.

SUMMARY

Techniques relate to reducing pathogens in liquids and sludge, in particular in sewage sludge from wastewater treatment plants, to below detectable levels, which may reduce the cost of producing Class A biosolids from Class B sludge (EPA 40 CFR, Part 503). One embodiment relates to exposing material contaminated with pathogens to high-intense alternating mechanical stress and strain, at sonic and/or ultrasonic frequencies, in an activator, which is a machine operating with high speed rotating tools. Thereby, cavitation is produced and maintained in the contaminated material along spiral-shaped paths between two, or more disks which counter-rotate at high RPM. Alkaline material may be added to raise the pH to values above ~10 to enhance the inactivation of pathogens. In another embodiment, heavy metals contaminating the liquid or sludge, are extracted by mechano-chemical adsorption. Other features and advantages will be apparent from the accompanying drawings and from the detailed description that follows below.

BRIEF DESCRIPTION OF THE DRAWINGS

The invention is illustrated by way of example and not limitation in the figures of the accompanying drawings, in which like references indicate similar elements, and in which.

DETAILED DESCRIPTION

One embodiment relates to reducing the cost of inactivating bacteria and virus present in Class B sludge (EPA rule 40 CFR, Part 257 and 503) produced at wastewater treatment plants and used for land application. Sewage sludge may contain the human health endangering bacteria Fecal Coliform and/or Salmonella sp., Enteric Virus and/or Helminth Ova.

Figure 1:
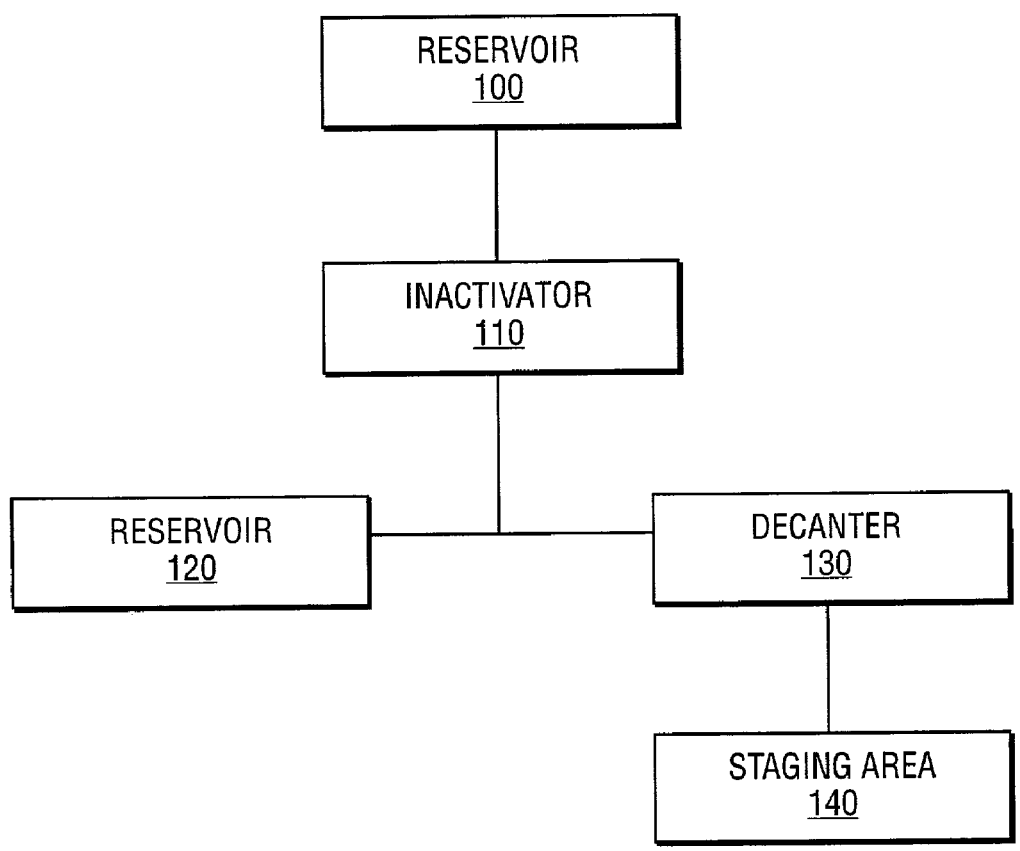
FIG. 1 is a block diagram illustrating a treatment method in accordance with one embodiment.

FIG. 1 is a block diagram illustrating a treatment method in accordance with one embodiment. A material containing pathogens, such as sewage sludge, is pumped to a tank or reservoir 100. If the sludge to be treated contains debris and/or rocks, they may be removed prior to treatment by sifting or screening (not shown). This may be accomplished by a conventional mechanical operation that separates the debris, rocks, etc., from the sludge. If the debris and rocks are contaminated, the debris and rocks may then be properly disposed of in accordance with any applicable state and federal law. The remaining contaminated material enters inactivator 110, in one embodiment, a machine for treatment of liquids, where pathogens contained in a liquid, or contained in a quasi-liquid matter, such as sewage sludge from wastewater treatment plants, may be exposed to, and inactivated by an intense alternating mechanical stress and strain field, at sonic and/or ultrasonic frequencies. In one embodiment, cavitation is produced and sustained in the contaminated material along spiral-shaped paths between two or more disks which rotate at high RPM.

Treating Class B sludge from wastewater treatment plants, the pathogens contained in such sludge may be inactivated below detectable levels, thus upgrading the Class B sludge to Class A biosolids. The Class A material is drained out and pumped to a storage tank or reservoir 120, or may be dewatered by a decanter 130, or any other adequate means, to, for example, greater than 27 percent solid content, in order to reduce the weight and/or volume for transportation to land application sites or other methods of disposal. The Class A biosolids are available for pick up by any means of hauling or transportation from the staging area 140, or from the reservoir 120, respectively.

Figure 2:
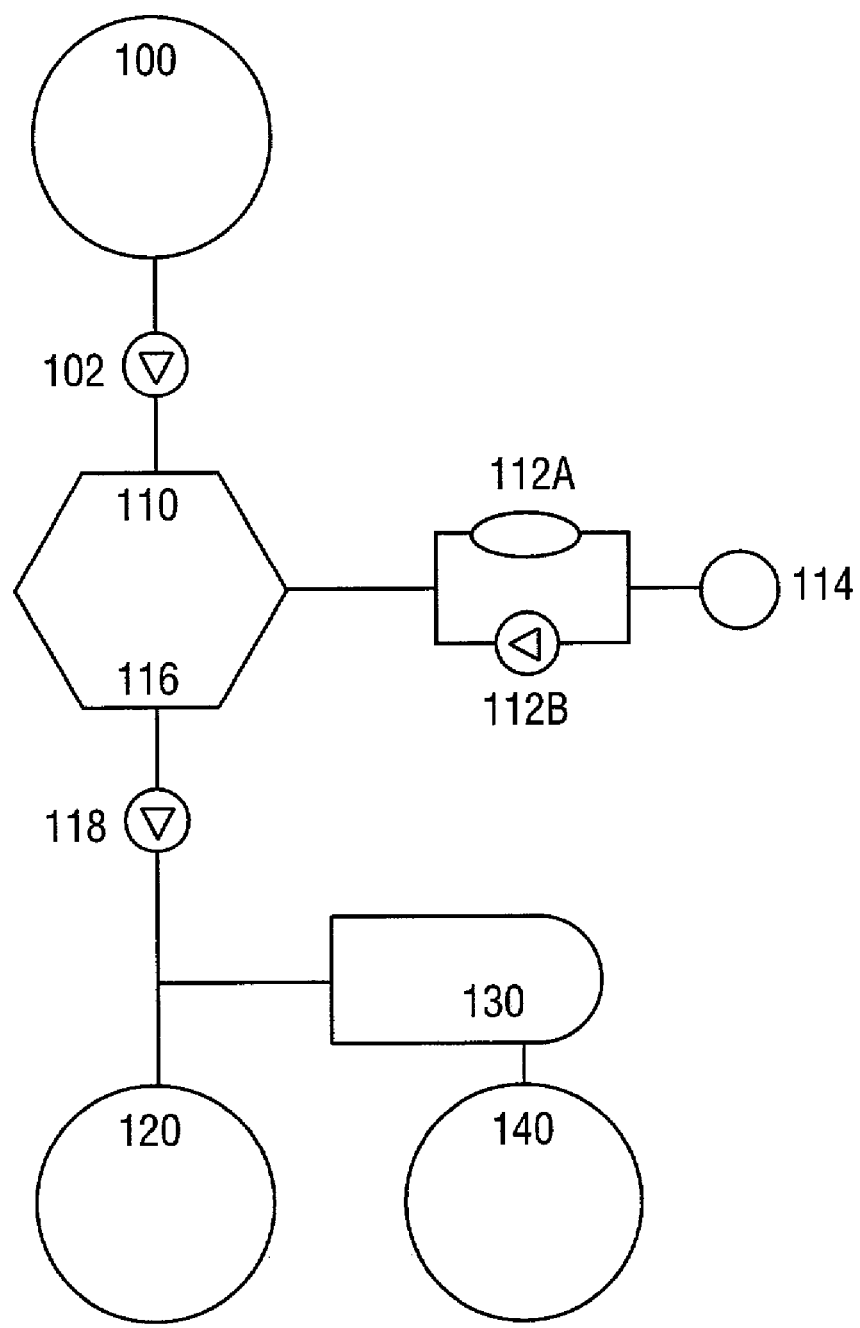
FIG. 2 is a schematic diagram of an apparatus used to inactivate pathogens in wastewater sludge in accordance with one embodiment.

FIG. 2 illustrates a schematic diagram of an overall process in accordance with one embodiment. Specifically, FIG. 2 illustrates tank or reservoir 100, from where the sludge is removed and fed by means of pump 102 into inactivator 110. In inactivator 110, sludge may be subjected to intense mechanical vibrations (i.e., to a sonic and/or ultrasonic field) whereby the pathogens are inactivated. In another embodiment, the effect of the inactivation of pathogens to undetectable levels may be enhanced by adding alkaline material. Suitable alkaline material includes, but is not limited to, quicklime, cement kiln dust, lime kiln dust, fluidized bed ash lime, injected multistage burner ash, fine calcium oxide, dry sulfur scrubbing residue, slag fines, pulverized calcium carbonate, Class C or Class F fly ash, alkaline gypsum, alum, calcium carbonate sludge from water purification plants or combinations thereof. The material may be conveyed by screw conveyor 112A and/or pump 112B from supply area 114. The alkaline material is admixed to the sludge during treatment in the inactivator 110, raising the pH of the mixture to pH 10 or more. The admixing of alkaline material during treatment tends to immediately raise the pH and promptly inactivate pathogens. This may be called "instantaneous active treatment by sound waves".

The Class A biosolid leaves inactivator 110 at exit 116 and is pumped by pump 118 either to reservoir 120, or to a dewatering stage 130, such as a decanter. After dewatering, the biosolids are available at staging area 140, or at reservoir 120, respectively.

Figure 3:
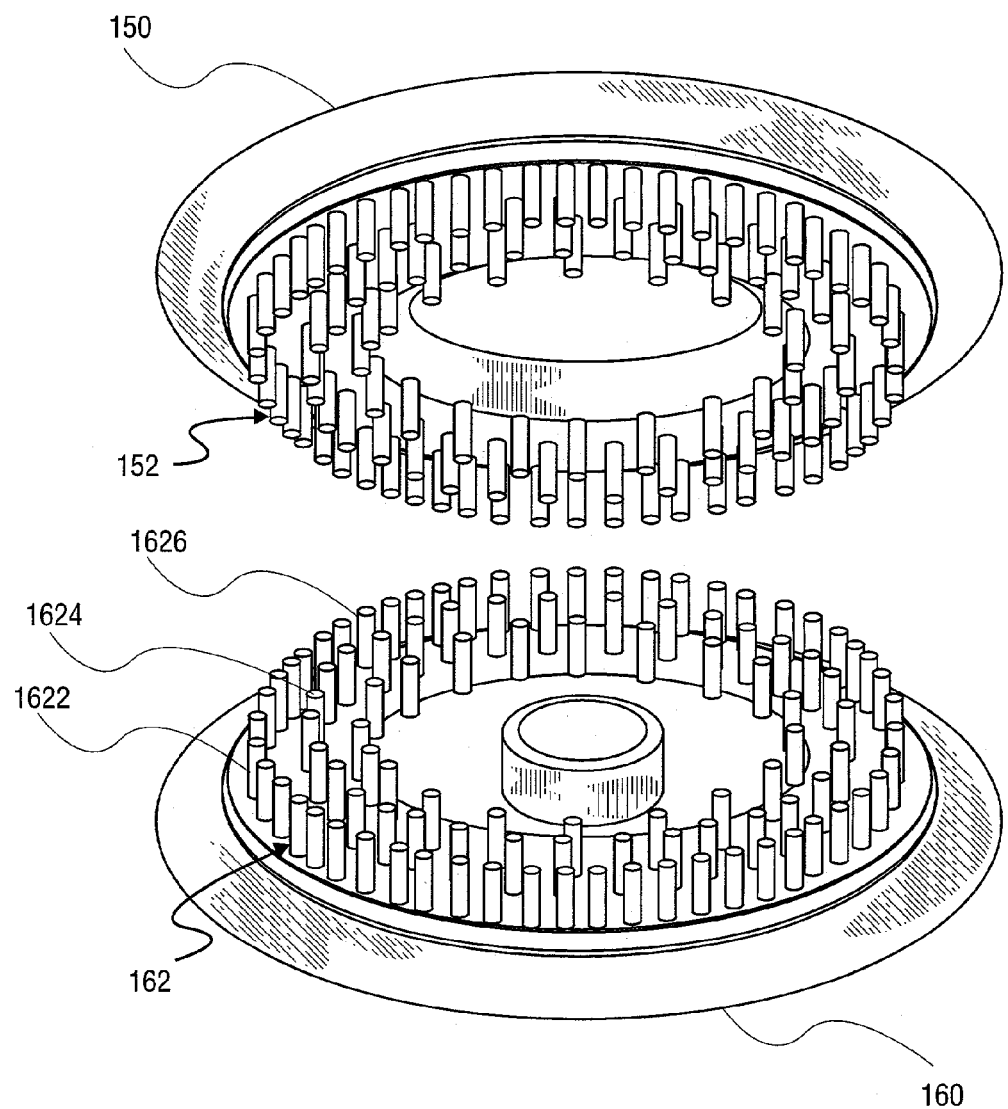
FIG. 3 is a perspective schematic view of a portion of an apparatus including two pin disks to produce alternate mechanical vibration in accordance with one embodiment.

FIG. 3 shows a tool of an inactivator, consisting of two disks (pin disks), first disk 150 and second disk 160. Both disks are equipped with pins. For purposes of illustration, in FIG. 3 the disks are shown opened to display the arrangements of first pins 152, and second pins 162. When closed, the pins are arranged so that first pins 152 and second pins 162 do not contact one another but instead occupy separate radii about an axis through each disk. It will be appreciated that the design and placement of first pins 152 and second pins 162 may be configured in numerous ways. An example of one such configuration is locating pins 152 circumferentially around disk 150 and pins 162 circumferentially around disk 160. A pin has, for example, an extended length on the order of 2.8 to 2.9 centimeters (cm) and a diameter on the order of 1.3 cm. Referring to second disk 160, first set of pins 1622 are located nearest to the outer diameter of second disk 160. Second set of pins 1624 are located radially inward from first set of pins 1622. Third set of pins 1626 are located radially inward from second set of pins 1624.

Regarding second disk 160 and second pins 162 shown in FIG. 3, first subset of pins 1622 has pins that are substantially equidistant apart. The distance from one pin to another pin in first subset of pins 1622 is, for example, on the order of 1.6 cm. Additionally, the radial distance between a pin in first subset of pins 1622 and a pin of second set of pins 1624 is, for example, on the order of 3.3 cm. Second subset of pins 1624 are substantially equidistant apart. The distance between one pin to another pin in second subset of pins 1624 is, for example, on the order of 2.1 cm. Third subset of pins 1626 also are substantially equidistant apart with a distance between one pin and another pin in third subset of pins 1626 of, for example, on the order of 2.0 cm. A radial distance between second subset of pins 1624 and a pin in third subset of pins 1626 is, for example, on the order of 3.3 cm. Representatively, first pins 162 on first disk 150 are place similarly to that described with respect to second pins 162.

In operation, disk 160 may be positioned parallel to disk 150. In one embodiment, disk 160 rotates at high RPM and disk 150 counter-rotates at high RPM, such that pins 162 pass pins 152 along their course, through which a stream of liquid under centrifugal forces crosses, resulting in a spiral-shaped like path, modulated by the impact of the pins. This crossing will create intense mechanical waves in the liquid. The frequency spectrum of the mechanical waves created will depend on the array of the pins, their configuration, and the RPM by which the disc rotates. With properly arranged pins, the frequency spectrum could be in the sonic or ultrasonic range. Representative average velocities of disk 150 and disk 160 to produce sonic frequencies are on the order of 4,000 RPM and, for ultrasonic frequencies, on the order of 6,000 RPM. At these velocities, the pins tend to create an intense cavitation which will act in the liquid or sludge which is between the two disks. The high-intensity alternating mechanical stress and cavitation causes an inactivation of pathogens.

Figure 4:
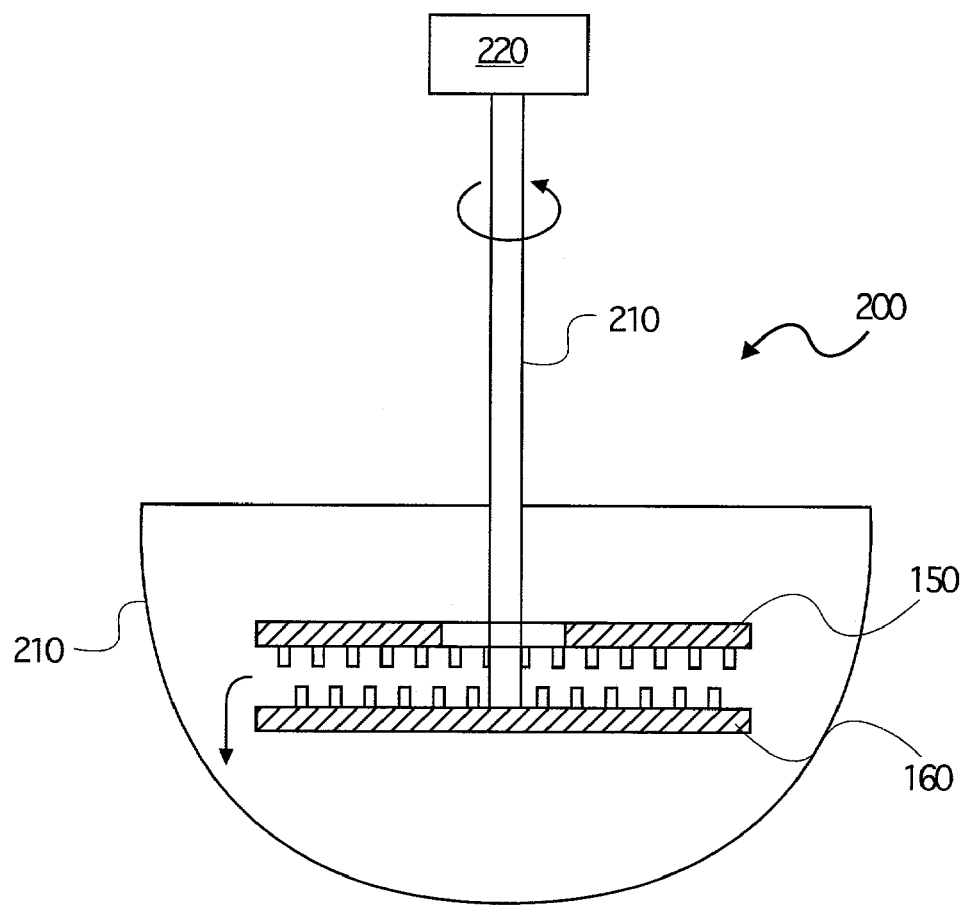
FIG. 4 is a cross-sectional side view of a portion of an apparatus including the pin disks of FIG. 3.

FIG. 4 shows a cross-sectional schematic side view of an embodiment of an inactivator. Inactivator 200 includes vessel 210 having dimensions suitable for accommodating first disk 150 and second disk 160 therein. At least one of first disk 150 and second disk 160, and, in another embodiment, both disks are coupled to shaft 210 and motor 220. Motor 220 rotates shaft 210 at a certain velocity and shaft in turn rotates first disk 150 and/or second disk 160. In an embodiment where each of first disk 150 and second disk 160 rotate, the rotation may be opposite one another. One way this is accomplished is by coupling one disk directly to shaft 210 and the other disk to a gear that meshes or mates with a gear on the disk. Representatively, one disk rotates clockwise while the other rotates counterclockwise.

In another embodiment, disk 160 remains stationary and disk 150 rotates at high RPM. In another embodiment, both disk 160 and disk 150 rotate, but the disks rotate at different speeds and/or directions so that there is relative rotation between the disks.

Variations of number and orientation of disks and pins are possible and contemplated within the scope of this invention to create mechanical waves and cavitation within a liquid.

In one embodiment, there is disclosed a method that includes exposing liquids and/or sludge contaminated with microorganisms and virus to high-intensity alternating mechanical stress and strain fields at sonic and/or ultrasonic frequencies, whereby cavitation is produced and sustained in the contaminated material along paths between two, or more disks, which counter-rotate at high RPM.

In one embodiment, there is disclosed a method that includes spiral-shaped paths between two or more disks.

In one embodiment, there is disclosed a method that includes adjusting a pH of the contaminated liquid and/or sludge to a weak alkaline range.

In one embodiment, there is disclosed a method that includes adjusting a pH of the contaminated liquid and/or sludge in an alkaline range of about 9 to about 12, and above.

In one embodiment, there is disclosed a method wherein the contaminated material contains one or many of the so-called heavy metals.

In one embodiment, there is disclosed a method that includes adding at least one sorbent material for the sorption of the heavy metal(s) under consideration in the contaminated material.

In one embodiment, there is disclosed a method wherein the sorbent material is one of a solid phase, a liquid phase, or a gaseous phase.

What is claimed is:

1. A method comprising:
    exposing a pathogen-containing material to alternating mechanical stress and strain fields at at least a sonic frequency; and
    cavitating the material between at least two counter-rotating disks.

2. The method of claim 1, further comprising:
    adjusting a pH of the material to an alkaline range.

3. The method of claim 1, further comprising:
    adjusting a pH of the material in an alkaline range of about pH 9 to pH 12.

4. The method of claim 1, wherein the material contains at least one heavy metal.

5. The method of claim 4, further comprising:
    adding at least one sorbent material for the sorption of the heavy metal(s) in the material.

6. The method of claim 5, wherein the sorbent material is of one of a solid phase, a liquid phase, or a gaseous phase.

7. The method of claim 1, wherein the disks are rotating at an average velocity of at least 4000 revolutions per minute.

8. The method of claim 1, wherein the disks are rotating at an average velocity on the order of 6000 revolutions per minute.

9. The method of claim 1, wherein the pathogen-containing material comprises a class B sludge.

10. A method comprising:
    exposing a Class B sludge to alternating mechanical stress and strain fields at at least a sonic frequency by cavitating the sludge between at least two counter-rotating disks; and
    upgrading the Class B sludge to a Class A biosolid.

11. The method of claim 10, wherein the disks are rotating at an average velocity of at least 4000 revolutions per minute.

12. The method of claim 10, wherein the disks are rotating at an average velocity on the order of 6000 revolutions per minute.

13. The method of claim 10, the method further comprising:
    dewatering the Class A biosolid.

* * * * *